United States Patent
Horne

(10) Patent No.: US 6,249,213 B1
(45) Date of Patent: Jun. 19, 2001

(54) METHOD FOR TRANSMITTING INFORMATION OVER AN ALTERNATING CURRENT POWER LINE THROUGH A PLURALITY OF FREQUENCY ORTHOGONAL SUBCHANNELS

(75) Inventor: David M. Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/215,889

(22) Filed: Dec. 17, 1998

(51) Int. Cl.$^7$ .................................................. H04M 11/04
(52) U.S. Cl. .................................. 340/310.01; 340/310.03
(58) Field of Search ........................ 340/310.01, 310.02, 340/310.3, 310.04, 310.06, 310.07; 375/259, 262

(56) References Cited

U.S. PATENT DOCUMENTS

| | | | |
|---|---|---|---|
| 3,803,490 | * 4/1974 | Almering et al. | 325/36 |
| 4,538,136 | * 8/1985 | Drabling | 340/310.01 |
| 4,679,225 | * 7/1987 | Higashiyama | 379/62 |
| 4,800,363 | * 1/1989 | Braun et al. | 340/310.01 |
| 5,058,138 | * 10/1991 | Figura et al. | 375/88 |
| 5,467,011 | * 11/1995 | Hunt | 340/310.01 |
| 5,805,822 | * 9/1998 | Long et al. | 395/200.62 |
| 5,841,807 | * 11/1998 | Hannebauer et al. | 375/206 |
| 5,859,584 | * 1/1999 | Counsell et al. | 340/310.01 |
| 6,005,477 | * 12/1999 | Deck et al. | 340/310.02 |
| 6,101,214 | * 8/2000 | Hershey et al. | 375/200 |
| 6,115,429 | * 9/2000 | Huang | 340/310.01 |

\* cited by examiner

*Primary Examiner*—Nina Tong
(74) *Attorney, Agent, or Firm*—Kenneth Seddon

(57) ABSTRACT

One embodiment of the present invention is a method for transmitting information over an AC power line. A frequency channel for transmitting the information is selected and divided into a plurality of frequency orthogonal subchannels. Each of the frequency orthogonal subchannels is tested to determine a value of a transmission characteristic, which in turn is used to determine a transmission bit density for the frequency orthogonal subchannel. The information is divided into a plurality of data subblocks. Each data subblock corresponds to one of the frequency orthogonal subchannels, and the size of each data subblock is determined based on the corresponding transmission bit density. The data of each data subblock is modulated for transmission through the corresponding frequency orthogonal subchannel. Each data subblock is transmitted approximately concurrently through the corresponding frequency orthogonal subchannel.

15 Claims, 3 Drawing Sheets

METHOD FOR TRANSMITTING INFORMATION OVER AN ALTERNATING CURRENT POWER LINE THROUGH A PLURALITY OF FREQUENCY ORTHOGONAL SUBCHANNELS

FIELD OF THE INVENTION

The invention relates to the field of communication, and more particularly to the field of communication over alternating current power lines.

BACKGROUND OF THE INVENTION

Alternating current (AC) power lines have been used to create local area networks (LANs) in buildings without requiring additional wires. However, the AC power line environment includes high, unpredictable noise levels and highly variable signal attenuation characteristics with multiple frequency dependent impairments. These impairments change not only dwelling to dwelling, but also vary within the same dwelling as devices are plugged into the AC power line or turned on or off. Prior approaches to reducing the effects of these impairments include redundant carriers and spread spectrum techniques. A drawback of these approaches is that they do not fully utilize the available bandwidth. Therefore, a novel approach to transmitting information over AC power lines has been developed.

SUMMARY OF THE INVENTION

A method for transmitting information over an AC power line is disclosed. A frequency channel for transmitting the information is selected. The frequency channel is divided into a plurality of frequency orthogonal subchannels. The information is divided into a plurality of data subblocks. Each data subblock corresponds to one of the frequency orthogonal subchannels. The data of each data subblock is modulated for transmission through the corresponding frequency orthogonal subchannel.

DETAILED DESCRIPTION OF A PREFERRED EMBODIMENT

A novel approach to transmitting information over an AC power line using a plurality of frequency orthogonal subchannels is described. In the following description, specific details are set forth in order to provide a thorough understanding of the present invention. It will be apparent, however, to one skilled in the art that the invention can be practiced without regard to these specific details. In other instances, well known concepts have not been described in particular detail in order to avoid obscuring the present invention.

One embodiment of the present invention is a method for transmitting information over an AC power line. A frequency channel for transmitting the information is selected and divided into a plurality of frequency orthogonal subchannels. Each of the frequency orthogonal subchannels is tested to determine a value of a transmission characteristic, which in turn is used to determine a transmission bit density for the frequency orthogonal subchannel. The information is divided into a plurality of data subblocks. Each data subblock corresponds to one of the frequency orthogonal subchannels, and the size of each data subblock is determined based on the corresponding transmission bit density. The data of each data subblock is modulated for transmission through the corresponding frequency orthogonal subchannel. Each data subblock is transmitted approximately concurrently through the corresponding frequency orthogonal subchannel.

In this embodiment, the dynamic impairments in the signal attenuation characteristics can be compensated for in a number of ways. For example, the AC power line can be tested prior to any transmission to select a preferred frequency channel or to switch from one frequency channel to another. In addition, or alternatively, the number of frequency orthogonal subchannels can be selected or changed depending on the characteristics of the frequency channel. Furthermore, the bit densities of data transmitted in each of the frequency orthogonal subchannels can be selected and changed depending on the characteristics of each frequency orthogonal subchannel.

Figure 1:
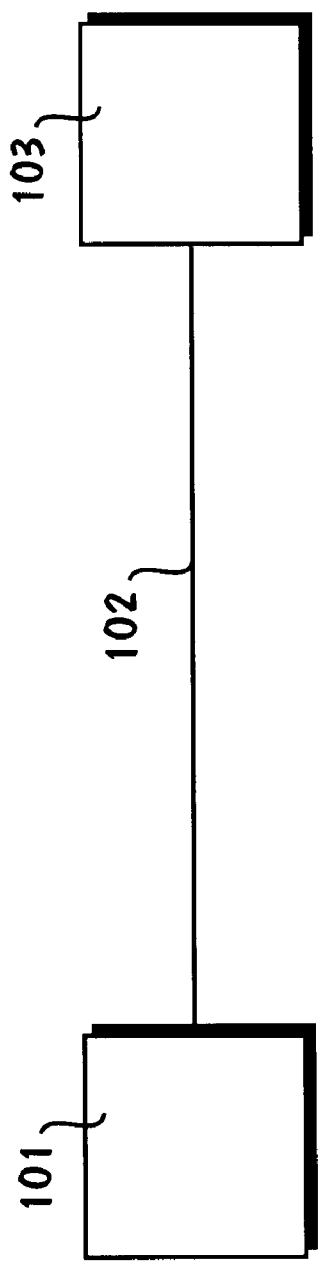
FIG. 1 is a block diagram of a system for transmitting information over an AC power line.
Figure 2:
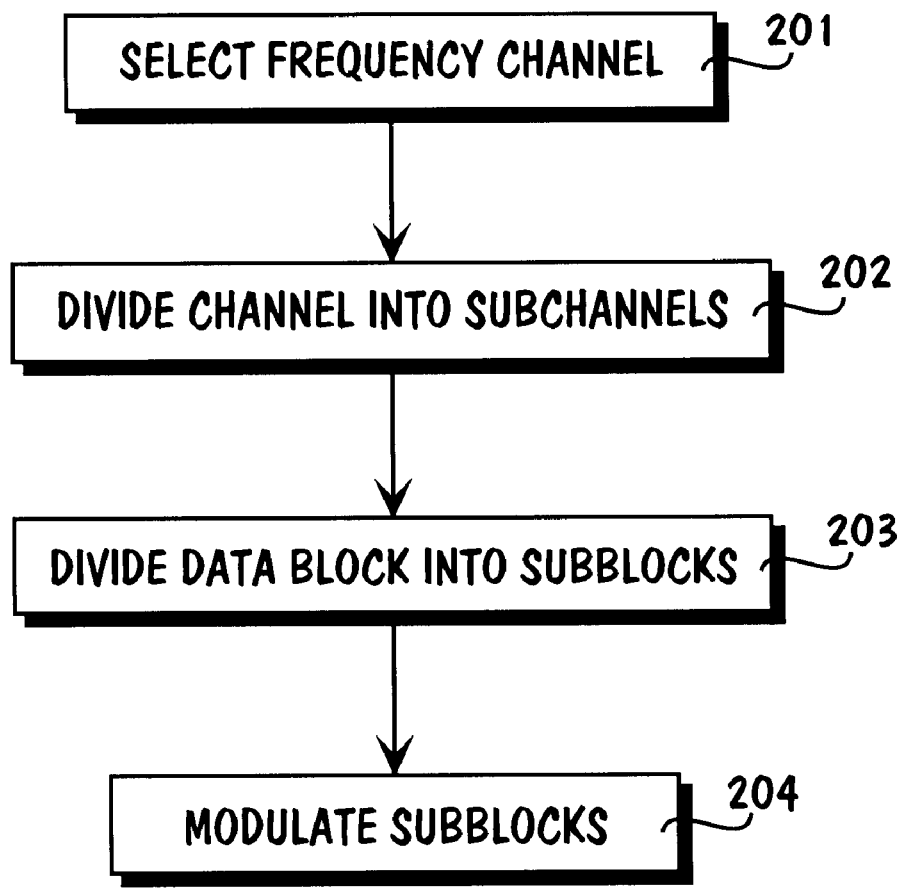
FIG. 2 is a flow chart illustrating one embodiment of the present invention.

FIG. 1 is a block diagram of a system for transmitting information over an AC power line. In FIG. 1, transmitter 101 is coupled to receiver 103 through AC power line 102. FIG. 2 is a flow chart illustrating an embodiment of the present invention for transmitting information from transmitter 102 to receiver 103.

In step 201 of FIG. 2, a frequency channel for transmitting the information over AC power line 102 is selected. In step 202, the frequency channel is divided into a plurality of frequency orthogonal subchannels. In step 203, the information is divided into a plurality of data subblocks. Each data subblock corresponds to one of the frequency orthogonal subchannels. In step 204, the data of each of the data subblocks is modulated for transmission through the corresponding frequency orthogonal subchannel.

Figure 3:
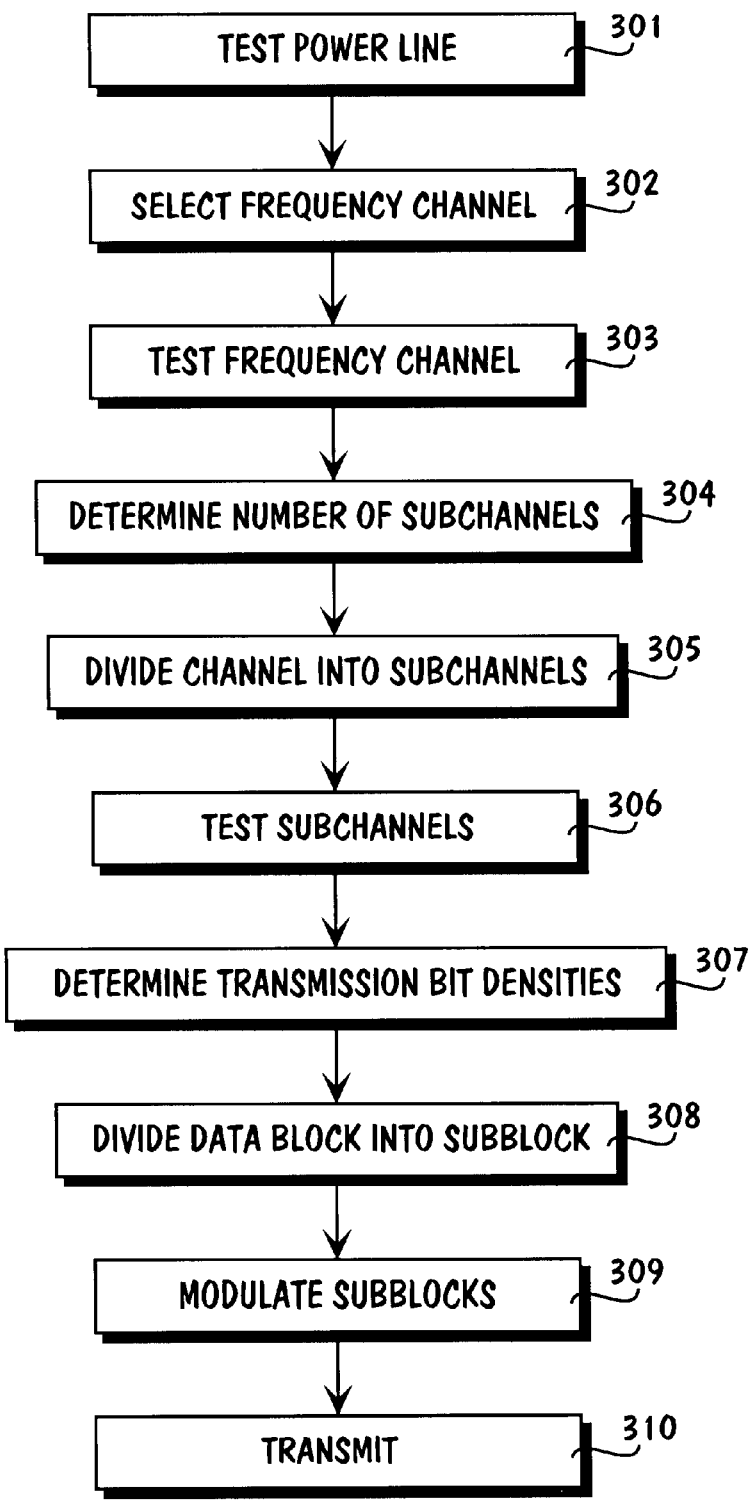
FIG. 3 is a flow chart illustrating another embodiment of the present invention.

FIG. 3 illustrates another embodiment of the present invention. In step 301 of FIG. 3, an AC power line is tested to generate a profile of a transmission characteristic, such as signal attenuation or background noise, using any of a variety of known techniques. In this embodiment, signal attenuation and background noise are profiled between a frequency of approximately 0 MHz and a frequency of approximately 20 MHz. In step 302, a frequency channel is selected based on the profile generated in step 301. The frequency channel can be selected to cover a range of frequency that has been found to be relatively free of impairments. In this embodiment, a frequency channel with a width of approximately 1 MHz is selected, to correspond to the width of the frequency channel used in conventional asymmetric digital subscriber line (ADSL) technology, so that conventional rate adaptive discrete multitone (DMT) techniques can be used in subsequent steps.

In step 303, the selected frequency channel is tested to generate a profile of a transmission characteristic, using any of a variety of known techniques, such as a conventional ADSL transceiver training and channel analysis technique. In step 304, the number of frequency orthogonal subchannels is determined based on the profile generated in step 303. The number of subchannels can be determined such that the subchannel width corresponds to the width of an impairment that has been detected, whether that is an impairment of minimum, typical, or maximum width. In step 305, the frequency channel is divided into the number of subchannels that was determined in step 304. For example, in an embodiment wherein the typical impairment has a width of 20 KHz, a channel with a width of 1 MHz can be divided into 50 subchannels such that the width of each subchannel equals the width of a typical impairment.

In step 306, each frequency orthogonal subchannel is tested to generate a value of a transmission characteristic for each subchannel using any of a variety of known techniques, such as a conventional ADSL transceiver training and channel analysis technique. In step 307, a transmission bit density for each subchannel is determined based on the corresponding value of the transmission characteristic. The transmission bit density can be determined such that any subchannels containing noise or impairments can be used to carry no data, or any fewer number of bits of data than the maximum permitted by the selected modulation technique. For example, in an embodiment wherein the maximum transmission bit density is fifteen bits per Hertz, the transmission bit density can be reduced to five bits per Hertz in a subchannel containing noise, and reduced to zero bits per Hertz in a subchannel containing an impairment.

In step 308, a frame of the information is divided into subblocks of data. The number of subblocks is determined by the number of subchannels, and the size of each subblock is determined by the corresponding transmission bit density. For example, in an embodiment wherein the maximum transmission bit density is fifteen bits per Hertz, and a transmission bit density of five bits per Hertz will be used for a particular subchannel, the size of the subblock of data corresponding to that subchannel can be the maximum subblock size divided by three. In step 309, the data of each subblock is modulated according to any of a variety of known techniques, such as Fast Fourier Transform processing and digital to analog conversion, for transmission through the corresponding subchannel. In step 310, each subblock is transmitted through the corresponding subchannel according to any of a variety of known techniques. In one embodiment, each subblock is transmitted approximately concurrently. In another embodiment, each subblock is transmitted simultaneously.

Steps 301 to 310 are repeated until all of the information has been transmitted. In this embodiment, a new frequency channel can be selected each time step 302 is repeated, a different number of subchannels can be determined each time step 304 is repeated, and a different transmission bit density can be determined for each subchannel each time step 307 is repeated.

The present invention can also be embodied in a machine-readable medium, such as a memory, a storage device, or a transmission medium, having stored thereon data representing a sequence of instructions. This sequence of instructions, when executed by a processor, causes the processor to execute a portion of the steps of the method illustrated in FIG. 2, the method illustrated in FIG. 3, or any other method that embodies the present invention. The processor can be integrated into a transmitter for transmitting the information or any other component, or can be a discrete component.

Thus, the exemplary embodiment of the present invention illustrated in FIG. 1 has been described. However, the present invention is not limited to this embodiment or any of the details described. For example, the invention could be practiced with some of the steps of FIG. 1 omitted or performed in a different sequence. The specification and drawings must be regarded in an illustrative rather than a restrictive sense. The scope of the present invention is defined by the following claims.

What is claimed is:

1. A method for transmitting information over an alternating current (AC) power line comprising steps of:

selecting a frequency channel for transmitting the information over the AC power line;

dividing the frequency channel into a plurality of frequency orthogonal subchannels;

dividing the information into a plurality of data subblocks, each data subblock corresponding to one of the frequency orthogonal subchannels; and modulating the data of each of the data subblocks for transmission through the corresponding frequency orthogonal subchannel.

2. The method of claim 1 further comprising a step of transmitting each data subblock through the corresponding frequency orthogonal subchannel approximately concurrently.

3. The method of claim 1 further comprising a step of testing each of the frequency orthogonal subchannels to determine a value of a transmission characteristic for each of the frequency orthogonal subchannels.

4. The method of claim 3 further comprising a step of determining a transmission bit density for each of the frequency orthogonal subchannels based on the value of the corresponding transmission characteristic.

5. The method of claim 4 wherein the step of dividing the information into a plurality of data subblocks further comprises a step of determining the size of each data subblock based on the corresponding transmission bit density.

6. The method of claim 1 further comprising a step of testing the frequency channel to determine a transmission characteristic profile for the frequency channel.

7. The method of claim 6 wherein the step of dividing the frequency channel into a plurality of frequency orthogonal subchannels further comprises a step of determining the number of frequency orthogonal subchannels based on the transmission characteristic profile.

8. A method for transmitting information over an alternating current (AC) power line comprising steps of:

(A) selecting a frequency channel for transmitting the information over the AC power line;

(B) dividing the frequency channel into a plurality of frequency orthogonal subchannels;

(C) testing each of the frequency orthogonal subchannels to determine a value of a transmission characteristic for each of the frequency orthogonal subchannels;

(D) determining a transmission bit density for each of the frequency orthogonal subchannels based on the value of the corresponding transmission characteristic;

(E) dividing a frame of the information into a plurality of data subblocks, each data subblock corresponding to one of the frequency orthogonal subchannels, the size of each data subblock being determined by the corresponding transmission bit density;

(F) modulating the data of each of the data subblocks for transmission through the corresponding frequency orthogonal subchannel;

(G) transmitting each data subblock through the corresponding frequency orthogonal subchannel; and (H) repeating steps (C) to (G) until the information has been transmitted.

9. A method for transmitting information over an alternating current power line comprising steps of:

(A) selecting a frequency channel for transmitting the information over the AC power line;

(B) dividing the frequency channel into a plurality of frequency orthogonal subchannels;

(C) dividing a frame of the information into a plurality of data subblocks, each data subblock corresponding to one of the frequency orthogonal subchannels;

(D) modulating the data of each of the data subblocks for transmission through the corresponding frequency orthogonal subchannel;

(E) transmitting each data subblock through the corresponding frequency orthogonal subchannel; and (F) repeating steps (A) to (E) until the information is transmitted.

10. A machine-readable medium having stored thereon data representing a sequence of instructions for transmitting information over an alternating current (AC) power line, wherein the sequence of instructions, when executed by a processor, causes the processor to perform steps of:

selecting a frequency channel for transmitting the information over the AC power line;

dividing the frequency channel into a plurality of frequency orthogonal subchannels;

dividing the information into a plurality of data subblocks, each data subblock corresponding to one of the frequency orthogonal subchannels; and modulating the data of each of the data subblocks for transmission through the corresponding frequency orthogonal subchannel.

11. The machine-readable medium of claim 10 wherein the sequence of instructions, when executed by a processor, further causes the processor to perform a step of testing each of the frequency orthogonal subchannels to determine a value of a transmission characteristic for each of the frequency orthogonal subchannels.

12. The machine-readable medium of claim 11 wherein the sequence of instructions, when executed by a processor, further causes the processor to perform a step of determining a transmission bit density for each of the frequency orthogonal subchannels based on the value of the corresponding transmission characteristic.

13. The machine-readable medium of claim 12 wherein the step of dividing the information into a plurality of data subblocks further comprises a step of determining the size of each data subblock based on the corresponding transmission bit density.

14. The machine-readable medium of claim 11 wherein the sequence of instructions, when executed by a processor, further causes the processor to perform a step of testing the frequency channel to determine a transmission characteristic profile for the frequency channel.

15. The machine-readable medium of claim 14 wherein the step of dividing the frequency channel into a plurality of frequency orthogonal subchannels further comprises a step of determining the number of frequency orthogonal subchannels based on the transmission characteristic profile.

* * * * *